United States Patent Office 3,224,939
Patented Dec. 21, 1965

3,224,939
METHOD FOR TREATING HELMINTHIC INFECTIONS
Marvin M. Hoehn and Gerald W. Probst, Indianapolis, Ind., assignors to Eli Lilly and Company, Indianapolis, Ind., a corporation of Indiana
No Drawing. Filed Mar. 21, 1963, Ser. No. 266,798
9 Claims. (Cl. 167—53)

The present application is a continuation-in-part of our application Serial No. 148,027, filed October 27, 1961, now abandoned.

This invention relates to therapeutic antiparasitic compositions and processes. More particularly this invention is concerned with therapeutic compositions comprising β-[4-(4-guanidinoacetamidino-1-methyl-2-pyrrolecarboxamido)-1-methyl - 2 - pyrrolecarboxadimo]propionamide and/or a degradation product thereof and to methods of treating parasitic infections therewith.

β-[4-(4-guanidinoacetamidino - 1 - methyl - 2 - pyrrolecarboxamido)-1-methyl - 2 - pyrrolecarboxamido]propionamide is an antibiotic discovered by Finlay and Sobin and described in U.S. Patent 2,586,762, and is commonly known as Netropsin® (a trademark of Chas. Pfizer and Company, Inc.). Its structure has been established by Waller et al., J. Am. Chem. Soc., 79 (1957), 1265. Although effective in inhibiting the growth of Gram-negative bacteria, it has not heretofore been known to have utility in human or animal therapy. Its hydrochloride appears to be effective for protecting wool fabrics from clothes moth larvae.

The antibiotic can be degraded by mild alkaline hydrolysis to a compound having the formula

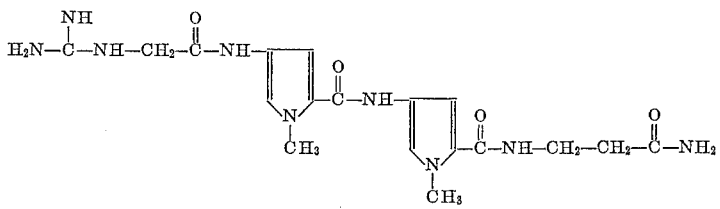

This degradation product can also be prepared synthetically as described in U.S. Patent 2,785,182. Like the parent antibiotic, the degradation product is effective in inhibiting bacterial growth, but has no known utility in human or animal therapy.

It has now been found that, quite unexpectedly, β-[4-(4-guanidinoacetamidino - 1 - methyl - 2 - pyrrolecarboxamido) - 1 - methyl - 2 - pyrrolecarboxamido]propionamide, its degradation product, and the salts thereof are highly efficacious therapeutic agents for eliminating parasitic infections in animals. Moreover, they are effective by oral administration. Thus, for example, a single oral dose of 50 mg./kg. of a mixture of β-[4-(4-guanidinoacetamidino-1-methyl - 2 - pyrrolecarboxamido)-1-methyl-2-pyrrolecarboxamido]propionamide hydrochloride and β-[4-(4-guanidinoacetamidino - 1 - methyl - 2 - pyrrolecarboxamido)-1-methyl - 2 - pyrrolecarboxamido]propionamide thiocyanate results in complete elimination of the mouse pinworm *Syphacia obvelata*.

The salts of β-[4-(4-guanidinoacetamidino-1-methyl-2-pyrrolecarboxamido)-1-methyl - 2 - pyrrolecarboxamido] propionamide and its degradation product employed in this invention can readily be prepared by methods well known in the art and include the hydrochloride, phosphate, sulfate, thiocyanate, embonate, maleate, salicylate, and the like, and in general the salts of the parent antibiotic and its degradation product with pharmaceutically acceptable acids.

An object of the present invention is to provide new therapeutic antiparasitic compositions effective against a broad spectrum of parasitic organisms. Another object is to provide an effective method for treating parasitic infections. Still another object is to provide a convenient means for oral therapy of helminthic infections. Other objects of the invention will become apparent from the detailed description which follows.

In accordance with the invention, control of helminthiasis is effected by administering to a parasitized host an effective amount of β-[4-(4-guanidinoacetamidino-1-methyl-2-pyrrolecarboxamido) - 1 - methyl - 2 - pyrrolecarboxamido]propionamide and/or its degradation product in any of a variety of dosage forms which may include the active compound alone or in combination with a pharmaceutical excipient such as a solid or liquid diluent, buffer binder, coating material, preservative, flavoring agent, emulsifier, or the like. The solid dosage forms are especially convenient to administer and may in one embodiment of this invention consist of tablets and/or filled capsules comprising the active compound and one or more of the commonly used solid diluents such as talc, lactose, starch, magnesium stearate, methylcellulose, and the like in such proportion as to furnish a definite dosage unit.

In another embodiment of this invention, particularly suited for domestic or farm animals, the oral dosage form may consist of the selected compound incorporated in a physiologically compatible excipient, for example an edible feedstuff, in such proportion as to provide the drug in high concentration, in which form it may be added to or mixed with the animal's feed in the proper dosage amount. The dose required for the animal can be blended with a portion or all of the feed consumed by the animal during a day or other time interval. The term edible feedstuff as used in this disclosure may refer to a normal dietary constituent of the animal, such as a complete ration, or a component or combination of components of the complete ration, or a mineral or vitamin supplement or the like, and in general any dietary component which is physiologically utilizable by the animal. Alternatively, the excipient may be any bland, non-irritating material which will be accepted by the animal, but which itself is not physiologically utilizable, as for example an ion exchange resin or the like.

In still another embodiment of this invention the drug may be suspended or dissolved in a suitable liquid diluent having properties not inconsistent with its oral or parenteral use, such as water, milk, physiological saline solution, or the like.

Because of its ease of preparation and slightly greater efficacy at comparable dosage levels, the use of β-[4-(4-guanidinoacetamidino-1-methyl-2-pyrrolecarboxamido)-1-methyl-2-pyrrolecarboxamido]propionamide, in the form of its addition salts, is preferred in the practice of the invention.

For the treatment of helminthiasis in animals, administration of the compound may be either as the pure drug, or in the form of a medicated feed, or in some other type of dosage form. Additionally, the drug may be given either in a single dose or in divided doses, extending in the extreme case throughout the life span of the animal. In single dose treatments, the dosages of the drug employed may range from around 25 to 500 mg./kg. of host body weight, preferably around 200 mg./kg. In divided doses, the total dose of drug may range from around 25 to 1,000 mg./kg. or more, depending upon the level at which the drug is given and the duration of treatment. Thus, for example, animals being raised for slaughter may be started on a medicated feed at an early age and maintained parasite-free throughout the growing period by continuous feeding of a ration containing the active compound in a concentration between about 5 parts per million to about 40 parts per million. The parasite-free animals show a markedly superior feed efficiency, resulting in an economic advantage for the grower. A method of choice for treating helminthiasis in swine comprises the continuous feeding for an eight-week period of a normal swine ration into which has been incorporated β-[4-(4-guanidinoacetamidino-1-methyl-2-pyrrolecarboxamido)-1-methyl - 2 - pyrrolecarboxamido]propionamide hydrochloride at a concentration of between about 6 and about 36 g. per ton of feed, preferably around 24 g. per ton. For small animals a preferred method is the oral administration of a single oral dose of the drug of about 25 to about 500 mg./kg. of host body weight, preferably about 200 mg./kg. It will be apparent to those skilled in the art that the actual dosage and method of administration selected will be dependent largely upon factors such as the size and general condition of the animal, the nature and degree of the parasitism, the rapidity with which the infection is to be eliminated, and the convenience of the method of treatment.

The outstanding anthelmintic activity of the preferred antibiotic salts is especially apparent in tests with the mouse pinworms *Syphacia obvelata* and *Aspiculuris tetraptera*. The response of these species is generally considered by those skilled in the art to parallel the response of other helminth species, especially *Enterobius vermicularis*, the pinworm parasitizing humans. Although a majority of anthelmintics control the species *S. obvelata*, very few are effective against *A. tetraptera*, dithiazanine iodide, piperazine, and gentian violet representing rather rare exceptions. In contrast, the β-[4-(4-guanidinoacetamidino-1-methyl - 2 - pyrrolecarboxamido)-1-methyl-2-pyrrolecarboxamido]propionamide salts at single oral doses of 100 mg./kg. effectively control this parasite, and even at lower doses a large proportion of the remaining worms are immature, suggesting, as one plausible explanation, that the drug has succeeded in arresting the development to adult worms. This in itself would represent essentially effective control inasmuch as it is only the adult worms which lay eggs which are the source of reinfection.

The antiparasitic activity of the compounds of this invention is not restricted to helminths. Protozoan parasites such as *Entamoeba histolytica* can be controlled by single or multiple doses of drug at dosages ranging from around 25 to 1,000 mg./kg. of body weight. Treatment of mice with β-[4-(4-guanidinoacetamidino-1-methyl-2-pyrrolecarboxamido) - 1 - methyl-2-pyrrolecarboxamido] propionamide salts in single intraperitoneal doses of around 25 to 500 mg./kg. of body weight is likewise effective in controlling the spirochete *Borrelia novyi*.

The operation of the invention may be more clearly explained by the following specific examples. It is to be understood, however, that the scope of the invention is not limited thereto and that many variations and modifications will suggest themselves to those skilled in the art.

EXAMPLE 1

Groups of pigs, four pigs per group, were segregated for this experiment from a larger group previously determined by examination of fecal samples to be naturally parasitized. Starting weights were about forty pounds. Both the treated and control groups were carried during the first four weeks of the experiment on a conventional swine grower ration containing about 16 percent protein. Each group was then fed a conventional swine finisher ration containing about 14 percent protein for the duration of the experiment. β-[4-(4-guanidinoacetamidino-1-methyl - 2 - pyrrolecarboxamido) - 1 - methyl-2-pyrrolecarboxamido]propionamide hydrochloride at the rate of 24 g./ton was added to both rations of the treated group. All parasites passed during the treatment period were counted daily. At the end of the experiment the animals were sacrificed and the unexpelled worms were counted. The sum of the passed worms and the remaining worms constituted the total worm burden for each animal. The results were summarized after 35 days as well as after 56 days and are presented in Table I.

*Table 1.—Anthelminthic effect of β-[4-(4-guanidinoacetamidino-1-methyl-2-pyrrolecarboxamido) - 1 - methyl-2-pyrrolecarboxamido]propionamide hydrochloride in swine at 24 g./ton of feed*

| Parasite | Worms Eliminated [a] | | | |
|---|---|---|---|---|
| | 35 Day Treatment | | 56 Day Treatment | |
| | Control, percent | Treated, percent | Control, percent | Treated, percent |
| *Ascaris suum* | 18 | 42 | 32 | 71 |
| *Oesophagostomum spp.* | 15 | 68 | 16 | 86 |
| *Trichuris suis* | 27 | 90 | 37 | 100 |

[a] Worms eliminated = $\frac{\text{worms passed}}{\text{total worms}} \times 100\%$.

EXAMPLE 2

Mice naturally infected with both species of mouse pinworm, *Syphacia obvelata* and *Aspiculuris tetraptera* were used in the following test. Each test group consisted of eight mice harboring the infections. Treatment with a mixture of about equal parts of β-[-(4-guanidinoacetamidino - 1 - methyl - 2 - pyrrolecarboxamido) - 1 - methyl-2-pyrrolecarboxamido]propionamide hydrochloride and β-[4 - (4 - guanidinoacetamidino-1-methyl-2-pyrrolecarboxamido) - 1 - methyl-2-pyrrolecarboxamido]propionamide thiocyanate was by the drug diet method in which a given percentage by weight of the drug mixture was incorporated into the daily food intake of the animals. Following treatment of one week's duration, the mice were kept for an additional day without further administration of drug. At the end of this time the animals were sacrificed and the remaining parasites were counted. In each instance a separate group of at least fifteen mice to which no drug was administered was kept as a control. Table II summarizes the results of treatment by this method.

*Table II.—Efficacy of β-[4-(4-guanidinoacetamidino-1-methyl - 2 - pyrrolecarboxamido) - 1 - methyl - 1 - pyrrolecarboxamido]propionamide salts administered in the diet*

| Amount of drug mixture in diet, wt. percent | Average Total intake of Drug, mg./kg. | Worm Reduction [a] | | Wt. Change, g./animal |
|---|---|---|---|---|
| | | *Syphacia obvelata*, percent | *Aspiculuris tetraptera*, percent | |
| 0.05 | 565 | 98 | 93 | +3.3 |
| .05 | 451 | 100 | [b] | −0.1 |
| .025 | 213 | 100 | [b] | +0.5 |
| .0125 | 126 | 99 | [c] | +0.7 |
| .0125 | 121 | 98 | [c] | +0.2 |
| .005 | 46 | 57 | [c] | +1.6 |

[a] Worm reduction = $\frac{\text{Avg. no. worms/control animal} - \text{avg. no. worms/treated animal}}{\text{Avg. no. worms/control animal}} \times 100\%$.
[b] Most worms found at autopsy were immature.
[c] No significant reduction over control animals.

The data show that as little as 0.0125% of the mixture of antibiotic salts incorporated in the diet resulted in almost complete eradication of the *Syphacia obvelata* population. The effect upon *Aspiculuris tetraptera* was much less pronounced in this method of administration than in the gavage method illustrated in the next example, although a high percentage of the worms remaining were immature. Lack of toxicity is reflected in the insignificant changes in weight of the animals.

EXAMPLE 3

The procedure of Example 2 was followed in detail except that the mode of administration of the drug mixture was by gavage, a method wherein the drug is forcibly introduced orally into the animal's alimentary tract by means of a stomach tube. The results are set forth in Table III.

*Table III.—Efficacy of β - [4 - (4-guanidinoacetamidino-1 - methyl - 2 - pyrrolecarboxamido) - 1 - methyl - 2 - pyrrolecarboxamido]propionamide salt mixture administered by gavage*

| Dose, mg./kg. | No. of Doses | Worm Reduction a | | Wt. Change, g./mouse |
|---|---|---|---|---|
| | | *Syphacia obvelata*, Percent | *Aspiculuris tetraptera*, Percent | |
| 100 | 4 | 100 | 100 | −1.7 |
| 100 | 1 | 99 | b c 94 | +0.8 |
| 100 | 1 | 98 | (d) | −0.5 |
| 50 | 1 | 100 | (c, d) | −1.5 |
| 25 | 1 | 87 | (d) | −0.9 | a Worm Reduction calculated as in Table II.
b Seven of eight mice. The remaining mouse had a large number of immature worms.
c Remaining worms immature.
d No significant reduction over control animals.

EXAMPLE 4

The procedure of Example 3 was followed in detail except that only β-[4-(4-guanidinoacetamidino-1-methyl-2 - pyrrolecarboxamido)-1-methyl-2-pyrrolecarboxamido] propionamide hydrochloride was used. Results are summarized in Table IV.

*Table IV.—Efficacy of β-[4-( 4-guanidinoacetamidino-1-methyl - 2 - pyrrolecarboxamido) - 1 - methyl - 2 - pyrrolecarboxamido]propionamide hydrochloride administered by gavage*

| Dose, mg./kg. | No. of Doses | Worm Reduction a | | Wt. Change, g./mouse |
|---|---|---|---|---|
| | | *Syphacia obvelata*, Percent | *Aspiculuris tetraptera*, Percent | |
| 500 | 1 | 100 | 100 | +1.2 |
| 200 | 1 | 100 | 98 | −0.2 |
| 100 | 1 | 100 | c 72 | +1.7 |
| 25 | 1 | 79 | (d) | +1.6 |

Explanation of symbols as in Table III.

Tables III and IV are illustrative of the fact that even at single oral doses as low as 100 mg./kg., the antibiotic salts effect a significant reduction in the population of adult *Aspiculuris tetraptera*. The somewhat variable results against Aspiculuris at this dosage level would suggest that this is probably a borderline dosage for this species and that a slightly higher dose would be preferable for optimum effectiveness. Essentially complete control of Syphacia is obtained at single oral doses of 50 m./kg. or above. Again, little or no toxicity is observed.

EXAMPLE 5

The procedure of Example 2 was followed except that β - [1 - methyl - 4 - (4 - guanidinoacetamido - 1 - methyl-2 - pyrrolecarboxamido)-2-pyrrolecarboxamido]propionamide was employed. At a level of 0.05% of the drug in the diet, all animals were completely cleared of *Syphacia obvelata*; at a level of 0.025% of the drug in the diet, the total worm load was reduced by 83%. All of the treated animals gained weight, indicating little or no drug toxicity.

EXAMPLE 6

The procedure of Example 3 was followed using the degradation product in place of the β-[4-(4-guanidinoacetamidino - 1 - methyl - 2 - pyrrolecarboxamido) - 1-methyl-2-pyrrolecarboxamido]propionamide salt mixture. A single oral dose of 100 mg./kg. completely cleared *Syphacia obvelata* from all animals; a single dose of 50 mg./kg. reduced the total worm load by 91%, and five of eight animals were completely cleared.

EXAMPLE 7

Heart blood from rats heavily infected with *Borrelia novyi* was pooled with a 2% solution of sodium citrate in normal saline, the latter solution serving as both a diluent and an anticoagulant. The resulting suspension, 0.1 ml. per animal, was inoculated intraperitoneally into normal mice, segregated in groups of at least four mice per group. Four to six hours after inoculation of the spirochetes, the mice were treated with β-[4-(4-guanidinoacetamidino - 1 - methyl - 2 - pyrrolecarboxamido) - 1-methyl-2-pyrrolecarboxamido]propionamide thiocyanate, either by gavage or by the intraperitoneal route. Eighteen to twenty hours after treatment a drop of tail blood from each animal was examined using a dark-field microscope. Ratings for each animal were tabulated according to the extent of parasitemia.

A single i.p. dose of the thiocyanate of 50 mg./kg. completely sterilized the parasitemia due to *B. novyi*. Single i.p. doses of 25 mg./kg. of the drug reduced the parasitemia in mice to the extent that not more than one spirochete per field was found. Single oral doses of 500 mg./kg. sterilized the parasitemia in about 70% of the mice while the remaining mice showed markedly reduced parasitemia. All control mice, infected with *B. novyi* but given no drug, demonstrated a marked parasitemia with an average of more than twenty spirochetes per field.

EXAMPLE 8

A medicated feed composition containing about 24 g. of β - [4 - (4 - guanidinoacetamidino - 1 - methyl - 2-pyrrolecarboxamido) - 1 - methyl - 2 - pyrrolecarboxamido]propionamide hydrochloride per ton of feed and suitable for swine was prepared by blending intimately 24 g. of the salt with a ton of ration prepared according to the following formula.

| Ingredient: | Quantity, lbs. |
|---|---|
| Corn, yellow, ground | 1575 |
| Alfalfa meal, dehydrated, 17% | 50 |
| Soybean oil meal, solvent extracted, dehulled, 50% | 200 |
| Meat scraps, 55% | 50 |
| Fish solubles, condensed, 50% solids | 50 |
| Animal fat | 40 |
| Calcium carbonate | 10 |
| Dicalcium phosphate, feed grade | 10 |
| Salt (NaCl) | 10 |
| Trace mineral premix a | 1 |
| Hog vitamin premix b | 5 | a Contains 12.20% manganese as manganese sulfate; 0.38% iodine as potassium iodide; 0.26% cobalt as cobalt sulfate; 9.60% iron as ferrous sulfate and ferrous carbonate, and red iron oxide (for color); 0.73% copper as copper carbonate; 5.00% zinc as zinc sulfate and zinc oxide; and 6.38% calcium as calcium carbonate.
b Each pound contains 200,000 USP units vitamin A, 60,000 USP units vitamin D₂, 200 mg. riboflavin, 600 mg. d-calcium pantothenate, 1 g. niacin, 26 g. choline chloride and 1 mg. vitamin B₁₂.

EXAMPLE 9

A medicated feed mix concentrate suitable for domestic pets is prepared by intimate blending of 30 kg. of β-[4-(4 - guanidinoacetamidino - 1 - methyl - 2 - pyrrolecarboxamido) - 1 - methyl - 2 - pyrrolecarboxamido]propionamide hydrochloride and 70 kg. of 50% soybean oil meal. This concentrate can be mixed by the owner with the pet's food in a quantity sufficient to furnish a therapeutic amount of the drug. Desirably, about one percent by weight of the concentrate is included in any dry or wet formulation of a prepared pet food at the time of manufacture. The pet consuming this medicated prepared food in normal amounts will receive a dose of about 75 to about 100 mg./kg. of body weight.

EXAMPLE 10

For the preparation of 1000 filled capsules containing 50 mg. of β-[4-(4-guanidinocetamidino-1-methyl-2-pyrrolecarboxamido) - 1 - methyl - 2 - pyrrolecarboxamido]propionamide activity per capsule, hydrochloride equivalent to 50 g. of the free base is mixed thoroughly with sufficient starch powder to make 233 g. of material. This mixture is then filled into No. 3 capsules at the rate of 233 mg. per capsule.

EXAMPLE 11

A suspension of β-[4-(4-guanidinoacetamidino-1-methyl-2-pyrrolecarboxamido) - 1 - methyl-2-pyrrolecarboxamido]propionamide sulfate containing about 50 mg. of antibiotic activity per 5 ml. of suspension is prepared by placing in a suitable container 400 g. of purified water, 1.0 g. of soluble saccharin, 10.0 g. of sodium citrate, 10.0 g. of sodium cyclamate, 250 g. of granulated cane sugar, 14.6 g. of β-[4-(4-guanidinoacetamidino-1-methyl-2-pyrrolecarboxamido) - 1 - methyl - 2 - pyrrolecarboxamido]propionamide sulfate and 60.0 g. of soluble fluid tolu. To this mixture is added a solution of 0.3 g. of methyl p-hydroxybenzoate, 0.3 g. of propyl p-hydroxybenzoate, 0.015 g. of butyl p-hydroxybenzoate, 0.15 g. of imitation oil of cassia, and 0.15 g. of root beer flavor No. 59002 in 20 ml. of 95% alcohol. After thorough mixing, there is added 200 g. of glucose and additional purified water in a quantity sufficient to make a total volume of 1000 ml.

EXAMPLE 12

β-[4-(4-guanidinoacetamidino - 1 - methyl-2-pyrrolecarboxamido) - 1 - methyl - 2 - pyrrolecarboxamido]propionamide hydrochloride (50 parts), lactose (150 parts), starch powder (47 parts) and magnesium stearate (3 parts) are granulated in the usual manner to give a mixture of uniform composition. The mixture is then compressed on a tableting machine to provide tablets each containing 50 mg. of β-[4-(4-guanidinoacetamidino-1-methyl-2-pyrrolecarboxamido) - 1 - methyl-2-pyrrolecarboxamido]propionamide hydrochloride. The tablets are preferably provided with a sugar coating before being bottled.

We claim:
1. The method of treating helminthic infections which comprises the administration to a parasitized animal of about 25 to about 1000 mg./kg. of host body weight of a compound selected from the group consisting of β-[4-(4 - guanidiocetamidino - 1 - methyl - 2 - pyrrolecarboxamido)-1-methyl - 2 - pyrrolecarboxamido]propionamide, the degradation product thereof having the formula

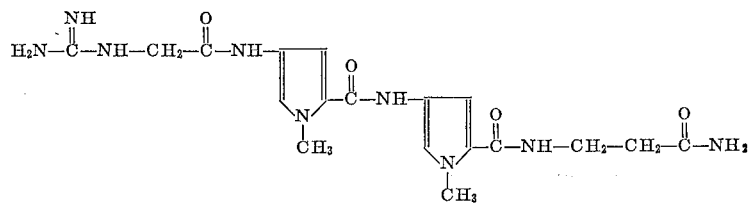

and the physiologically acceptable salts thereof.
2. The method of treating helminthic infections which comprises the administration to a parasitized animal of a single oral dose of about 500 mg./kg. of host body weight of a compound selected from the group consisting of β-[4-(4-guanidinoacetamidino - 1 - methyl-2-pyrrolecarboxamido) - 1 - methyl - 2 - pyrrolecarboxamido]propionamide, the degradation product thereof having the formula

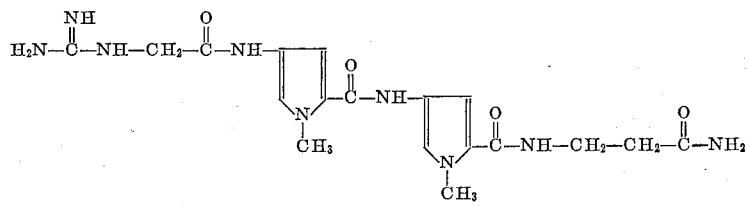

and the physiologically acceptable salts thereof.
3. The method of treating helminthiasis in animals which comprises the oral administration to a host animal of divided doses totalling about 25 to about 1000 mg./kg. of host body weight of a compound selected from the group consisting of β-[4-(4-guanidinoacetamidino-1-methyl - 2 - pyrrolecarboxamido)-1-methyl-2-pyrrolecarboxamido]propionamide, the degradation product thereof having the formula

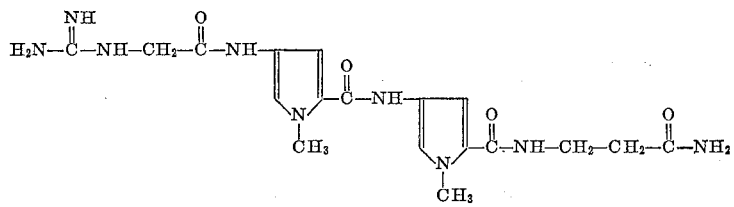

and the physiologically acceptable salts thereof.
4. The method of treating helminthiasis in animals which comprises the oral administration to a host animal of repeated daily doses of about 1 to about 100 mg./kg. of host body weight of a compound selected from the group consisting of β-[4-(4-guanidinoacetamidino-1-methyl-2-pyrrolecarboxamido) - 1 - methyl - 2 - pyrrolecarboxamido]propionamide, the degradation product thereof having the formula

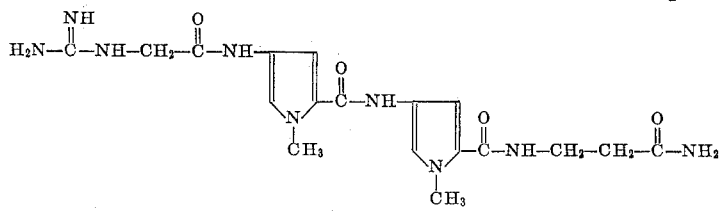

and the physiologically acceptable salts thereof.

5. The method of treating helminthic infections which comprises the administration to an animal of about 25 to about 1000 mg./kg. of β-[4-(4-guanidinoacetamidino-1-methyl - 2 - pyrrolecarboxamido)-1-methyl-2-pyrrolecarboxamido]propionamide hydrochloride.

6. The method of treating helminthic infections which comprises the administration to an animal of about 25 to about 1000 mg./kg. of β-[4-(4-guanidinoacetamidino-1-methyl - 2 - pyrrolecarboxamido)-1-methyl-2-pyrrolecarboxamido]propionamide thiocyanate.

7. The method of treating helminthic infections which comprises the administration to an animal of about 25 to about 1000 mg./kg. of a mixture comprising about equal parts of β-[4-(4-guanidinoacetamidino-1-methyl-2-pyrrolecarboxamido) - 1 - methyl - 2 - pyrrolecarboxamido]propionamide hydrochloride and β-[4-(4-guanidinoacetamidino - 1 - methyl-2-pyrrolecarboxamido) - 1-methyl-2-pyrrolecarboxamido]propionamide thiocyanate.

8. The method of treating helminthic infections which comprises the administration to an animal of about 25 to about 1000 mg./kg. of β-[4-(4-guanidinoacetamidino-1-methyl - 2 - pyrrolecarboxamido)-1-methyl-2-pyrrolecarboxamido]propionamide sulfate.

9. The method of treating helminthic infections which comprises the administration to an animal of about 25 to about 1000 mg./kg. of the degradation product of β-[4-(4-guanidinoacetamidino - 1 - methyl - 2 - pyrrolecarboxamido)-1-methyl - 2 - pyrrolecarboxamido]propionamide having the formula

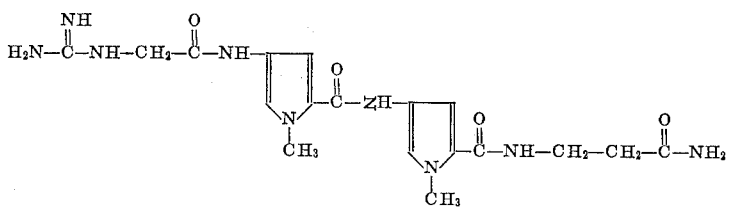

References Cited by the Examiner
UNITED STATES PATENTS

| | | | |
|---|---|---|---|
| 2,586,762 | 2/1952 | Finlay | 167—65 |
| 2,785,182 | 3/1957 | Waller | 260—326.3 |

JULIAN S. LEVITT, *Primary Examiner.*

FRANK CACCIAPAGLIA, Jr., *Examiner.*